United States Patent [19]
VerWest

[11] Patent Number: 6,058,073
[45] Date of Patent: May 2, 2000

[54] ELASTIC IMPEDANCE ESTIMATION FOR INVERSION OF FAR OFFSET SEISMIC SECTIONS

[75] Inventor: Bruce J. VerWest, Pryford, United Kingdom

[73] Assignee: Atlantic Richfield Company, Los Angeles, Calif.

[21] Appl. No.: 09/281,378

[22] Filed: Mar. 30, 1999

[51] Int. Cl.$^7$ ....................................................... G01V 1/00
[52] U.S. Cl. ............................................... 367/31; 367/38
[58] Field of Search .................................. 367/31, 83, 38, 367/47, 68

[56] References Cited

U.S. PATENT DOCUMENTS

| | | | |
|---|---|---|---|
| 4,964,096 | 10/1990 | Ruckgaber | 367/70 |
| 5,583,825 | 12/1996 | Carrazzone et al. | 367/31 |
| 5,862,100 | 1/1999 | VerWest | 367/38 |

OTHER PUBLICATIONS

Aki and Richards, *Quantitative Seismology—Theory and Methods*, vol. I (Freeman, 1980), pp. 123–192.

Connolly, "Calibration and Inversion of Non–Zero Offset Seismic", *Expanded Abstracts of 1998 Annual Meeting* (SEG, 1998), Paper AVO 1.5, pp. 182–184.

*Primary Examiner*—Christine K. Oda
*Assistant Examiner*—Anthony Jolly
*Attorney, Agent, or Firm*—Anderson, Levine & Lintel

[57] ABSTRACT

A computer-implemented method, and system implementing the method, of performing impedance inversion of seismic survey data are disclosed. Sonic and density well logs are used to generate an elastic impedance model, at selected angles of incidence or offset range, using an expression for elastic impedance that depends upon the measured or estimated compressional velocity, shear velocity, and density of the subsurface layers in the survey region. The elastic impedance expression also includes a reference density value, and is dependent upon the ray parameter (or angle of incidence). This elastic impedance model is used, for example by way of a pseudo-density log, in estimating the input wavelet, and in carrying out an impedance inversion of the seismic survey over the entire survey region, for at least two angles of incidence. Low-frequency components of the elastic impedance, at the selected angles of incidence, are merged with the corresponding impedance inversion sections, to produce a merged impedance model at the selected angles of incidence. Rock properties, such as Poisson's ratio, are then retrieved from a comparison, such as a ratio, of the impedance traces at the varying angles of incidence for common midpoints.

19 Claims, 6 Drawing Sheets

ELASTIC IMPEDANCE ESTIMATION FOR INVERSION OF FAR OFFSET SEISMIC SECTIONS

CROSS-REFERENCE TO RELATED APPLICATIONS

Not applicable.

STATEMENT REGARDING FEDERALLY SPONSORED DEVELOPMENT

Not applicable.

BACKGROUND OF THE INVENTION

This invention is in the field of seismic prospecting for oil and gas reservoirs, and is more specifically directed to inversion analysis of seismic surveys.

As is well known in the art of seismic prospecting for hydrocarbon (i.e., oil and gas) reservoirs in the earth, inversion is an attractive technique for automating the interpretation of seismic results. In general, inversion refers to the analytical approach in which time-domain signals corresponding to the reflection of acoustic energy from reflective interfaces between subsurface strata in the earth are converted into one or more traces representative of physical attributes of the strata. In contrast, seismic reflection surveys provide only an indication of the contrast of layer properties at a reflective interface between the layers.

In practice, conventional seismic inversion typically begins by creating a model of the surveyed region based upon an extraction of the geological properties of the detected subsurface strata. These geological properties are typically measured by way of well logs and the like, at calibration points in the survey. This model is then used to generate synthetic seismograms, which are compared against actual seismic reflection traces at the calibration points; iterative techniques are then applied to match the model to the actual reflection traces, and to then extract a representation of the input wavelet. The extracted input wavelet is then used to derive a filter operator that can be applied to the overall seismic data, by frequency-domain division (or equivalent time-domain deconvolution) or by other techniques such as sparse spike inversion, to effect the inversion of the reflection traces into a series of reflection coefficients. These reflection coefficients are converted into velocity and density values for the surveyed layers, completing the inversion.

Impedance-based inversion is a known inversion technique in modem seismic prospecting. In this conventional example of impedance inversion, the initial model is based upon the combination of a sonic (velocity) log with a density log, at one or more drilling locations. Through inversion based upon this model, the seismic reflectivity section is converted into a section that represents the acoustic impedance of the various represented strata to the imparted seismic energy, as a function of position and depth in the region. Because acoustic impedance corresponds to the product of the density and acoustic velocity of the medium, the acoustic impedance can indicate actual physical properties of the rock, such as porosity and the composition of material in the rock pores (i.e., pore fill). Accordingly, impedance inversion sections are potentially much more informative to the geologist than are reflectivity sections, which simply indicate the location of reflective subsurface interfaces and the nature of contrasts in rock properties thereat. Indeed, reflectivity sections are unable to distinguish among possible physical causes of the reflections; for example, a reflection due to a change in the rock properties of the reservoir interval may appear quite similar to a reflection due to a change in the properties of an overlying seal. In addition, impedance inversion techniques can be used to remove the input wavelet from the resulting sections, improving the resolution with which the petrophysically interesting information can be retrieved from the seismic data. Impedance inversion thus eliminates some of the necessity for, and inaccuracy in, human interpretation of the seismic survey.

It is well known in the art, however, that impedance inversion from seismic reflectivity traces alone is band-limited, because the reflectivity data is itself band-limited. However, information regarding porosity and pore fill also contains "low-frequency" information, and thus cannot be directly extracted from impedance inversion of conventional reflectivity data. As a result, conventional impedance inversion analysis typically imports low frequency information from a model based on well log information and measured seismic velocities. An example of impedance inversion utilizing model information to provide the low frequency data is described in U.S. Pat. No. 4,964,096.

Several geophysical software packages for performing impedance inversion are known in the art. Examples of such products include the JASON GEOSCIENCE WORKBENCH system available from Jason Geosystems, the STRATA package available from Hampson-Russell, and the ISIS package available from Odegaard A/S. These conventional packages require a reflectivity section, background seismic velocities, and well impedance measurements. According to these known inversion techniques, the product of the well log density and velocity is used to derive the impedance measurements for each layer in the model, for calibration with zero offset seismic data.

Figure 1:
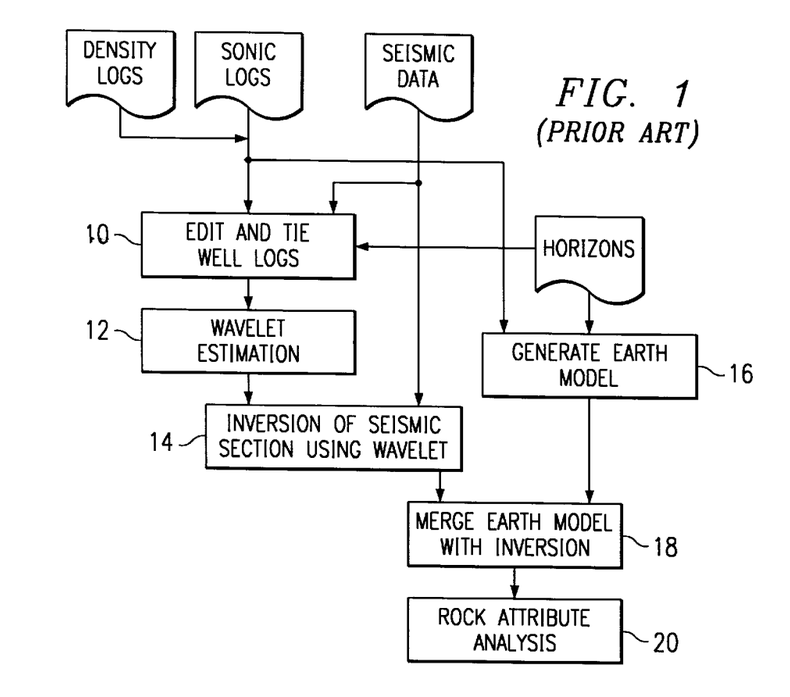
FIG. 1 is a flow chart illustrating the operation of a conventional impedance inversion process.

FIG. 1 illustrates a conventional example of impedance inversion, for example as performed according to the JASON GEOSCIENCE WORKBENCH system from Jason Geosystems. As illustrated in FIG. 1, density and sonic (velocity) well logs are obtained, and applied to process 10 in which the logs are edited and tied to zero-offset (i.e., near-offset traces, stacked to zero-offset) seismic data and to previously interpreted horizons. In process 12, estimation of the input wavelet to the seismic data is performed, in the conventional manner, using the edited and tied well logs and the zero-offset seismic data at the well locations. The estimated input wavelet is then applied, as a filter, to the seismic data over the survey region, in inversion process 14; inversion is carried out, as noted above, according to one of several inversion techniques such as constrained sparse spike inversion (CSSI), stochastic inversion, and the like.

Because the seismic reflection data are band-limited, however, low frequency information regarding density and velocity is not determined in the inversion of process 14. Accordingly, in this conventional approach, process 16 generates an earth model of density and velocity using previously interpreted horizons in the survey region of interest. This earth model corresponds to low frequency variations of density and velocity, and is merged with the inversion from process 14 in process 18, to produce a density and velocity model of the earth over both low and high frequencies. This model is then analyzed in process 20, to determine such rock parameters as porosity.

However, Amplitude-versus-Offset (AVO) surveys have shown that some important hydrocarbon reservoirs exhibit relatively little reflectivity at zero offset, while exhibiting significant reflectivity at larger offsets. As with other regions of the earth that potentially contain oil and gas reservoirs, it would of course be useful to utilize impedance inversion techniques to identify the rock properties that directly relate to the presence of oil and gas, such properties including porosity and pore fill. While it is possible to construct seismic sections for a particular (relatively small) range of offset (or angle of incidence, or ray parameter), heretofore there has been no adequate mathematical definition of elastic impedance that may be used in extrapolating the limited-offset range sections over a wider range.

Consider that a desired elastic impedance expression, for a rock layer k, should be a function of its density $\rho_k$, its compressional velocity $\alpha_k$, its shear velocity $\beta_k$, and the angle of incidence i, or:

$$EI_k = f(\rho_k, \alpha_k, \beta_k, i)$$

As is well known in the art, the reflectivity r(i) at an interface between two layers, as a function of angle, is the ratio of the difference of elastic impedance of the two layers to the sum of the impedances:

$$r(i) = \frac{EI_i - EI_{i+1}}{EI_i + EI_{i+1}}$$

This relationship between the reflectivity and the elastic impedance of the layers could provide a link between the reflection traces and the rock properties. However, the absence of a known mathematical definition of the actual elastic impedance function has prohibited this type of analysis.

One possible approach toward an offset-dependent impedance inversion would be to use the zero offset acoustic impedance to calibrate the inversion. As noted above, however, some important reservoirs have low reflectivity at zero offset but high reflectivity at far offset. As a result, the use of zero offset impedance values in these surveys necessarily lacks the essential element necessary for accurate calibration, namely the significant far-offset reflectivity. Impedance inversion under these conditions will thus result in a poor tie to the seismic section, an incorrect extracted wavelet, poor resolution, and the inability to determine the Poisson's ratio for the reservoir.

Another possible approach toward an offset-dependent impedance inversion would be to use approximations of elastic impedance as derived from density logs and measurements or estimates of compressional and shear velocities for the various layers in the region. As noted above, no exact definition of elastic impedance as a function of the rock properties exists. However, approximations of elastic impedance over limited angle ranges near zero offset are known. For example, Connolly, "Calibration and Inversion of Non-Zero Offset Seismic", *Expanded Abstracts of* 1998 *Annual Meeting* (SEG, 1998), pp. 182–184, describes one such approximation as follows:

$$EI = \alpha^{1+\tan^2(i)} \beta^{-8K\sin^2(i)} \rho^{1-4K\sin^2(i)}$$

where K is the average of the ratio $$\left(\frac{\beta}{\alpha}\right)^2$$

across the interface of interest. This approximation is derived by integration of the approximation of the Zoeppritz equation as given in Aki and Richards, *Quantitative seismology: Theory and Methods,* (W. H. Freeman & Co., 1980), p.153. It has been observed, in connection with the present invention, that this approximation of elastic impedance depends upon average properties across an interface and also upon reference values for density, compressional velocity, and shear velocity. These dependencies render the application of this approximation very difficult when applied to multi-layer sequences of interfaces, such as are typically represented by well logs. Use of this approximation without the averaged values (in the ratio K) returns an unstable elastic impedance value, and results in inaccurate reflectivity values. Similar alternative approximations for elastic impedance have also been constructed from the inversion of reflectivities calculated from the Zoeppritz equations, but these approximations have no direct connection to rock properties, limiting their use in interpretation of the survey. In addition, the absolute magnitude of the impedance in these approximations is an integration constant, with no physical meaning.

BRIEF SUMMARY OF THE INVENTION

It is therefore an object of the present invention to provide a method for impedance inversion analysis of seismic survey data that uses a model for elastic impedance of subsurface layers that depends only upon the medium parameters for each layer, and a reference density value.

It is a further object of the present invention to provide such a method in which the elastic impedance model closely approximates the measured reflectivity in the survey.

It is a further object of the present invention to provide such a method which can be used for calibrating far offset inversion and for accurately extracting the input wavelet.

It is a further object of the present invention to provide such a method in which the impedance model is relatively insensitive to measurement or estimation errors.

Other objects and advantages of the present invention will be apparent to those of ordinary skill in the art having reference to the following specification together with its drawings.

The present invention may be implemented into an automated method of interpreting a seismic survey. Using a well log or similar measurements, or estimates thereof, a density value and compressional and shear velocities are assigned to each layer of the earth at the well or calibration location. According to the present invention, an elastic impedance is then assigned to each layer, using a formula that depends only upon these density and velocity values for each layer, along with a reference density (such as an average density for the region). The elastic impedance is assigned according to a model in which high order error terms are reduced to insignificant values; the impedance model also includes an angle of incidence term, so as to vary with offset. The elastic impedance model at the calibration location is then tied to actual reflectivity data for that location, over multiple offsets. The overall seismic survey is then inverted into an impedance inversion section for each of the offset ranges, each merged with a low frequency model. Comparison of near and far offset elastic impedances at the same point of interest, according to the present invention, yields a survey of Poisson's ratio, as well as porosity, over the survey region.

DETAILED DESCRIPTION OF THE INVENTION

Figure 2:
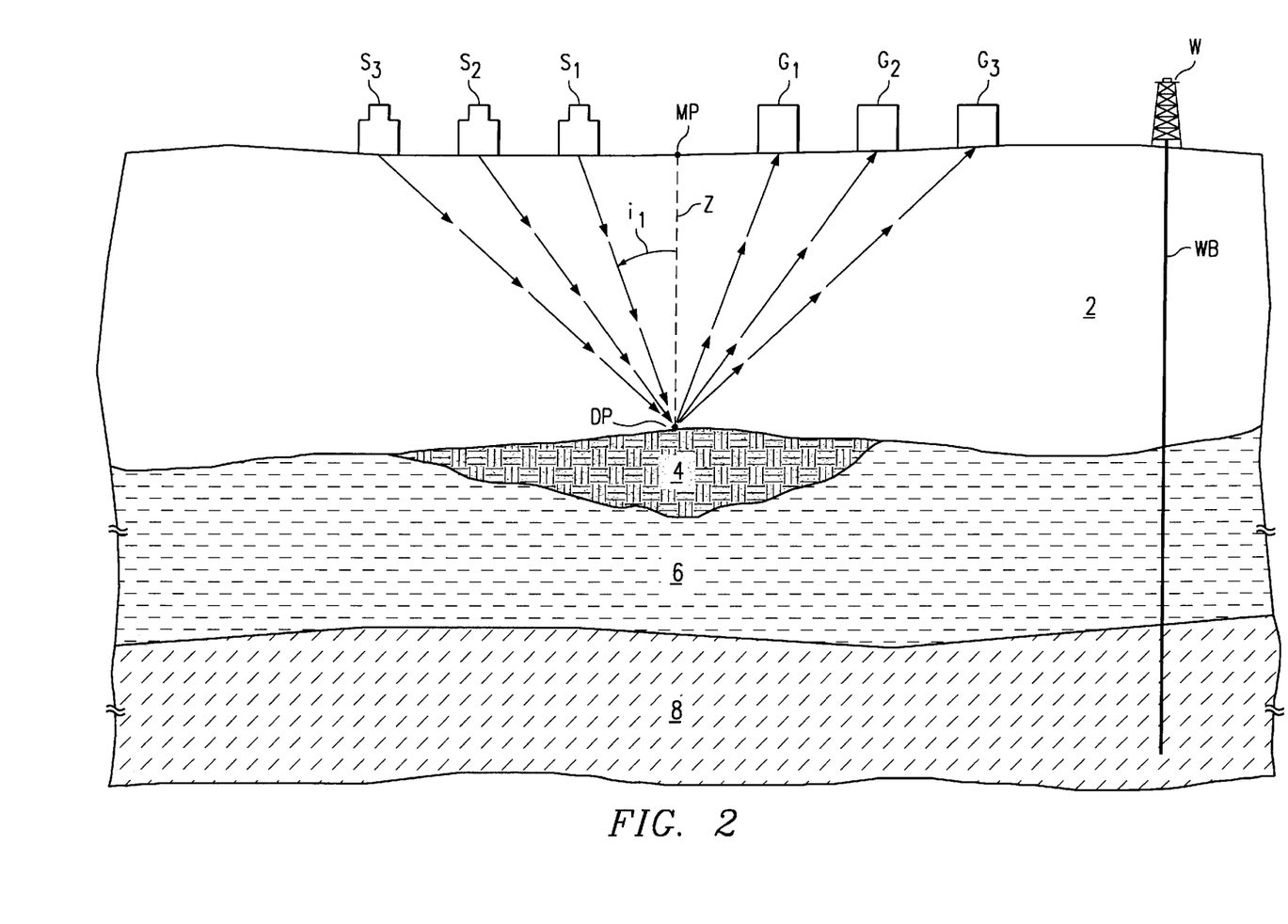
FIG. 2 is a cross-sectional view of a portion of the earth illustrating the obtaining of a seismic survey interpreted according to the preferred embodiment of the present invention.

FIG. 2 schematically illustrates an exemplary land-based seismic survey with which the preferred embodiment of the present invention is useful. While the survey of FIG. 2 is a land-based survey, it will of course be appreciated that the present invention is also applicable to marine surveys.

In the example of FIG. 2, a single depth point DP is illustrated as present at a horizon between formations 2, 4; of course, a multitude of depth points DP are located within the survey region of FIG. 2, and will be used to generate a seismic survey of either the two-dimensional or three-dimensional (2-D or 3-D) type. Depth point DP corresponds to the top surface of sand formation 4, which is one of several strata 2, 4, 6, 8 within the subsurface survey region of interest shown in FIG. 2. As is evident from FIG. 2, seismic energy from multiple source locations will be reflected from the interface between formations 2, 4 at depth point DP, and this energy will be detected by multiple receivers, such that the reflections travel along multiple paths in the earth at varying angles of incidence upon depth point DP. A zero-offset reflection is indicated by path Z between depth point DP and midpoint MP, which is the surface location directly above depth point DP. Seismic energy imparted by source $S_1$ is reflected from depth point DP and detected by geophone $G_1$; the angle of incidence $i_1$ is the angle of the path of energy from source $S_1$ from the vertical (i.e., from the zero-offset path). Similarly, energy imparted by sources $S_2$, $S_3$ is reflected from depth point DP and detected by geophones $G_2$, $G_3$, at increasing angles of incidence i from the normal.

Typically, the amplitude of the imparted seismic energy will vary with variations in the angle of incidence i. The variation in the amplitude of the energy with the angle of incidence i is the basis of amplitude-versus-offset (AVO) seismic analysis techniques, which are powerful techniques for identifying not only the location of reflective interfaces, but also the properties of the various strata. More specifically, as described in U.S. Pat. Nos. 5,661,697, 5,784, 334, and 5,862,100, all commonly assigned herewith and incorporated hereinto by this reference, several so-called AVO indicators have been developed that, from the relationship between the AVO intercept (corresponding to the relative amplitude of the reflected energy to the imparted energy at a depth point, extrapolated to zero offset) and the AVO slope (or variation of reflected energy with offset), identify the location of potential hydrocarbon reservoirs.

As discussed above, it has been discovered that, for several petrophysically important regions of the earth, potential oil and gas reservoirs exhibit large reflectivity at large offset, but small reflectivity at near-zero offset. It is further believed that this reflectivity differs for shear and compressional energy, such that significant offset-dependent variations in impedance are exhibited by oil and gas reservoirs at these locations. It is therefore believed that this angle-dependent behavior can be used to identify the location of these reservoirs. According to the preferred embodiment of the invention, the powerful technique of impedance inversion is used to identify these important geological features from conventionally-gathered seismic survey data.

FIG. 2 also illustrates, in the survey region of interest, the presence of well location W. Well location W, in this example, corresponds to an existing drilled well having a wellbore WB along which well logs and other measurements have been obtained by conventional techniques. According to the preferred embodiment of the present invention, the measurements at well location W include, for each layer k that is at or above the deepest layer of interest in the survey, the compressional velocity $\alpha_k$, shear velocity $\beta_k$, and density $\rho_k$. In the alternative to actual measurements for each layer, estimates or other extrinsic data or inferences may be obtained. For purposes of the following description, the velocity and density measurements for each layer k in the survey will be referred to as well log measurements, it being understood that these values may be derived from estimates or obtained from such alternative extrinsic data.

Figure 3:
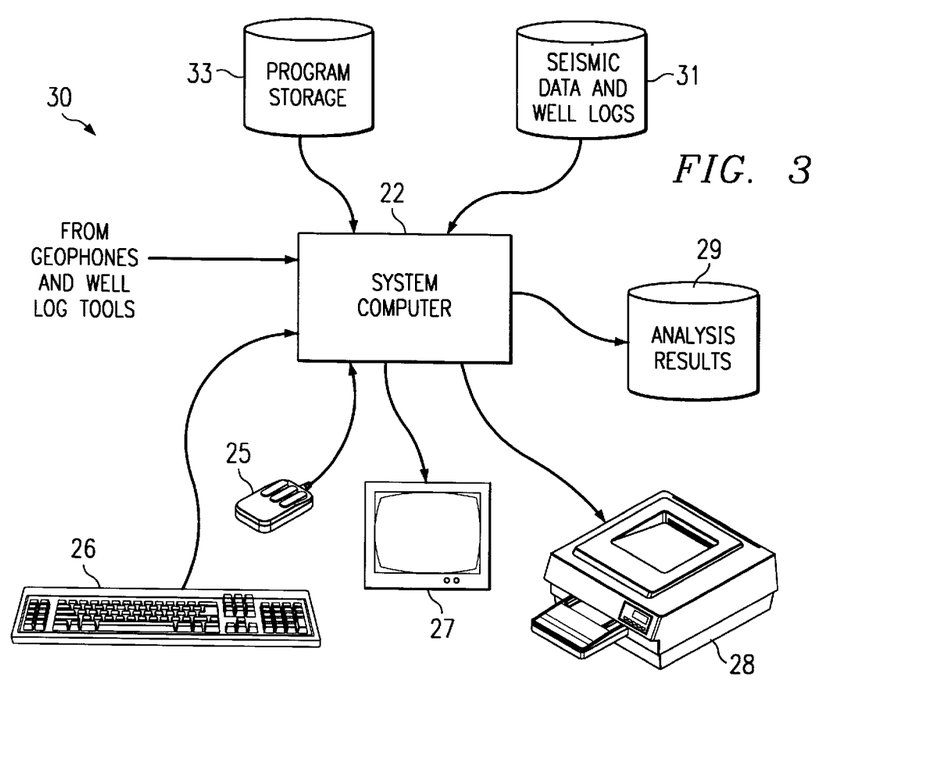
FIG. 3 is an electrical diagram, in block form, of a computer system for performing the operations according to the preferred embodiment of the invention.

Referring now to FIG. 3, a computer system into which the preferred embodiment of the invention may be implemented, will be described. This system includes system computer 22, which may be implemented as any conventional personal computer or workstation, preferably a UNIX-based workstation such as a SPARCstation available from Sun Microsystems, Inc., implemented either in standalone fashion, or as part of a network arrangement. System computer 22 is in communication with disk storage devices 29, 31, and 33, which are preferably external hard disk storage devices in a network. It is contemplated that disk storage devices 29, 31, 33 are conventional hard disk drives, and as such will be implemented by way of a local area network or by remote access. Of course, while disk storage devices 29, 31, 33, are illustrated as separate devices, a single disk storage device may of course be used to store any and all of the program instructions, measurement data, and results as desired.

Seismic data from geophones G are stored on disk storage device 31, and retrieved by system computer 22 in its performing of inversion analysis according to the preferred embodiment of the present invention, by executing program instructions that correspond to the method described hereinbelow. For operation on system computer 22, the program instructions are written in the form of a computer program (e.g., in C++ or in another suitable language) stored in computer-readable memory, such as program disk storage device 33 of FIG. 3; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 22 presents output primarily onto graphics display 27, or alternatively via printer 28; further in the alternative, system computer 22 may store the results of the analysis described hereinbelow on disk storage device 29, for later use and further analysis. Keyboard 26 and pointing device (e.g., a mouse, trackball, or the like) 25 are provided with system computer 22 to enable interactive operation. As noted, system computer 22 is able to communicate with disk storage devices 29, 31, including external hard disk storage on a network and floppy disk drives. System computer 22 is typically located at a data center remote from the survey region.

In the example of a land-based survey, as shown in FIG. 2, system computer 22 is in communication with geophones G (either directly or via a recording unit, not shown), to receive signals indicative of the reflected seismic energy received thereat in the survey. This seismic survey data may be newly obtained survey traces, or alternatively may consist of previously obtained seismic survey data, depending of course upon the availability of such data for the desired region. In either case, it is necessary that the seismic survey data include, for each of the desired depth points of interest, reflection data for both near and far offsets, preferably with reflection angles up to and exceeding at least 30 degrees. In addition, disk storage device 31 is also coupled to receive and store well log measurements from well location W (and such other locations as are available and useful in the survey region), such well log measurements including, as described above, density, compressional velocity, and shear velocity, for each of the layers k in the subsurface region corresponding to the seismic reflection survey and for which interpretation is to be performed. These signals, after conventional formatting and other initial processing, are stored by system computer as digital data in disk storage device 31 for subsequent retrieval and processing in the manner described hereinbelow. While FIG. 3 illustrates disk storage device 31 as directly connected to system computer 22, it is also contemplated that disk storage device 31 may be accessible through a local area network or by remote access. Furthermore, while disk storage devices 29, 31 are illustrated as separate devices for storing input seismic data and analysis results, respectively, disk storage devices 29, 31 may of course be implemented within a single disk drive (either together with or separately from program disk storage device 33), or in any other conventional manner as will be fully understood by one of skill in the art having reference to this specification.

Figure 4:
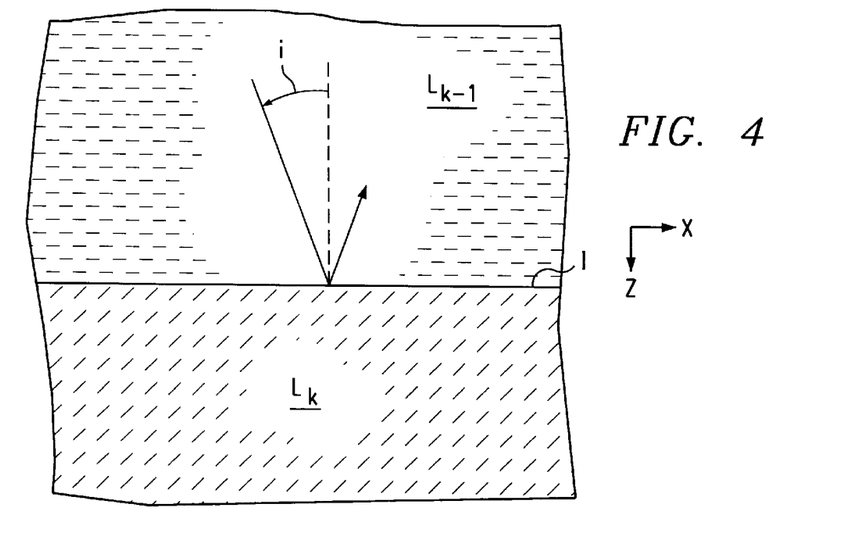
FIG. 4 is a schematic diagram of a cross-section of the earth, establishing some of the nomenclature used in the description of the preferred embodiment of the invention.

The theoretical background of a model of elastic impedance that will be implemented in connection with the preferred embodiment of the present invention, will now be described. This impedance model is based upon the consideration that the impedance of a medium corresponds to the ratio of the traction (or adhesive friction) of the particles of the medium, in the direction of particle motion, to the particle velocity. In an acoustic medium having a planar interface, as may be roughly assumed for geological formations, the reflection coefficient of acoustic energy at the interface depends upon the continuous boundary conditions of traction and particle velocity perpendicular to the interface. For purposes of establishing the nomenclature convention for this description, FIG. 4 illustrates a schematic example of such an interface I between layers $L_k$ and $L_{k-1}$, where layer $L_k$ is the lower of the two layers. Angle of incidence i is shown, in this case, for compressional (P) waves. As shown in FIG. 4, the z-direction is downward, while the x-direction is from left-to-right; the y-direction is into or out of the page, and is not of consideration in this example. One may express these boundary conditions in terms of an angle-dependent acoustic impedance that is the ratio of the traction in the z-direction to the particle velocity in that direction, as follows:

$$AI(i) = \alpha\rho/\cos(i)$$

This expression for angle-dependent acoustic impedance is exact for all angles i of propagation.

According to the present invention, the exact forms for compressional (P) and vertical shear (SV) waves in an elastic medium are used by analogy in deriving an elastic impedance model; in contrast, conventional elastic impedance models are often based upon approximations to the Zoeppritz equations. With reference to the exact form for the P and SV waves, for example as described in Aki and Richards, *Quantitative Seismology: Theory and Methods* (Freeman and Co., 1980), pp. 144–151, the leading term in an elastic impedance should be considered to have the form:

$$EI = \frac{\alpha\rho}{\cos(i)}(1 - 2\sin^2 j)^2 + \ldots$$

where j is the angle of incidence of SV energy at the planar interface I. The ray parameter p (i.e., the "slowness" vector as described in Aki and Richards, supra), is a constant for refraction at the boundary between media, or:

$$p = \frac{\sin(i)}{\alpha} = \frac{\sin(j)}{\beta}$$

It has been observed that use of the ray parameter p, as opposed to angle of incidence i, is preferred for the multi-layer system such as shown in FIG. 2, because actual plane waves travel with constant ray parameter but not with a constant angle of incidence. Combining these two expressions, the elastic impedance form may be expressed as:

$$EI = \frac{\alpha\rho}{\sqrt{1 - \alpha^2 p^2}}(1 - 2\beta^2 p^2)^2 + \ldots$$

It is contemplated that those in the art will readily recognize that this leading term for elastic impedance reduces to the angle-dependent acoustic impedance described above, for $\beta=0$, as is expected for liquid media or other zero-shear layers.

Figure 5:
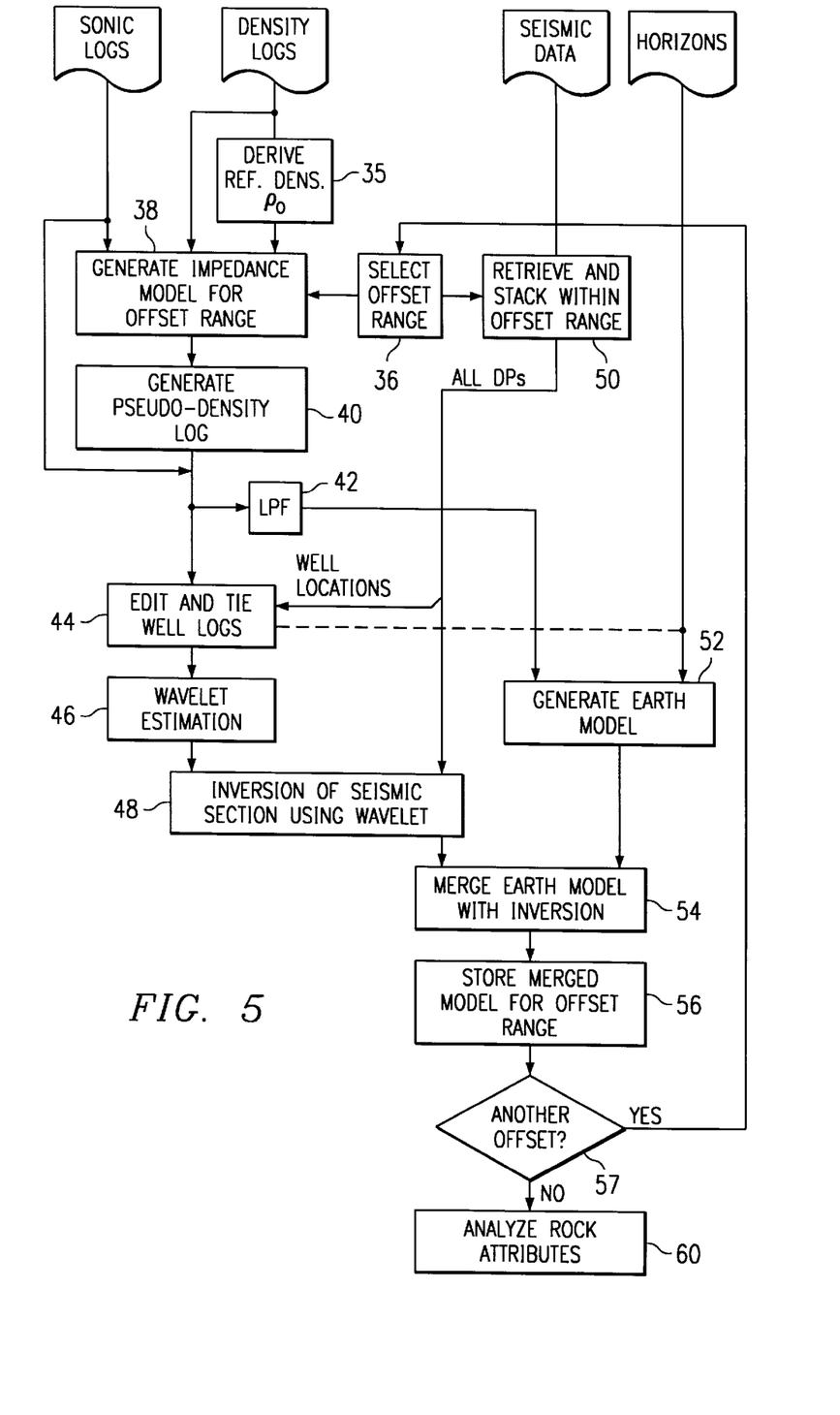
FIG. 5 is a flow diagram illustrating the operation of inversion analysis of a seismic survey according to the preferred embodiment of the invention.

According to the preferred embodiment of the invention, the elastic impedance model to be applied, for example by system computer 22, preferably depends only upon the medium parameters for each layer k in the region. Consider, therefore, the expression for a reflection coefficient $r_{EI}(p)$, as a function of ray parameter p, between layers $L_{k-1}$ and $L_k$, as shown in FIG. 5, as follows:

$$r_{EI}(p) = \frac{EI_k - EI_{k-1}}{EI_k + EI_{k-1}}$$

which is the usual reflection expression, based on the ratio of impedance difference to impedance sum. Because the desired interpretation performed according to the present invention is primarily interested in small contrasts in the medium parameters, evaluation of the approximation of the elastic impedance may be carried out by study of the error between the reflection coefficient $r_{EI}(p)$, as a function of ray parameter p, and the actual reflection coefficient r(p), or:

$$\Delta = r(p) - r_{EI}(p)$$

Both of these reflection coefficient terms may be expanded in terms of the average and changes of the compressional velocity, shear velocity, and density, where the changes in these parameters are correct to at least the first order, and also in terms of the powers of ray parameters p. Such expansion, using the first term form:

$$EI = \frac{\alpha\rho}{\sqrt{1-\alpha^2 p^2}}(1-2\beta^2 p^2)^2$$

produces the following expression for reflection coefficient error:

$$\Delta = p^2\left(-2\overline{\beta}^2\left[\frac{\Delta\rho}{\overline{\rho}}\right]\right) + p^4\left(8\overline{\beta}^3\Delta\beta\right) + p^6\left(16\overline{\beta}^5\Delta\beta\right) + \ldots$$

where $\overline{\alpha}$ and $\Delta\alpha$ are the average and difference compressional velocities, respectively, $\overline{\beta}$ and $\Delta\beta$ are the average and difference shear velocities, respectively, and $\overline{\rho}$ and $\Delta\rho$ are the average and difference densities, respectively.

One may readily observe, however, that the second order p term presents error that is first order in density change. It has been found, according to the present invention, that this order of error may be reduced through the insertion of an additional factor to the definition of elastic impedance, namely a reference density value $\rho_0$. Reference density $\rho_0$ is a constant reference density, preferably selected to correspond to the average of the densities $\rho_k$ for layers k in the survey region of interest. This average may be a simple arithmetic mean, or alternatively may be derived as a weighted average of the densities $\rho_k$, weighted by layer thickness. As will be described below, it is contemplated that the elastic impedance model according to the preferred embodiment of the invention is not particularly sensitive to this reference density $\rho_0$, and as such the particular method by way of which reference density $\rho_0$ is derived is not critical to the accuracy of the overall inversion process. The insertion of the reference density $\rho_0$ into the elastic impedance expression may be accomplished as:

$$EI = \frac{\alpha\rho}{\sqrt{1-\alpha^2 p^2}}(1-2\beta^2 p^2)^2\left(\frac{\rho}{\rho_0}\right)^{-4\beta^2 p^2}$$

This expression for elastic impedance modifies the reflectivity coefficient error expression to the following:

$$\Delta = p^2\left(4\overline{\beta}\Delta\beta\ln\left[\frac{\overline{\rho}}{\rho_0}\right]\right) + p^4\left(8\overline{\beta}^3\Delta\beta\right) + p^6\left(16\overline{\beta}^5\Delta\beta\right) + \ldots$$

In those cases where the reference density value $\rho_0$ is close to the average density in the survey region of interest, the log term in the error expression is of the same order as the density difference $\Delta\rho$, so that the error in the second order p term is second order in medium properties difference parameters. However, the magnitude of the fourth power term of p renders this model unusable except for near-offset analysis.

According to the preferred embodiment of the present invention, the model for elastic impedance is modified to reduce the error terms by way of a rational approximation. The modified model is:

$$EI_{new} = \frac{\alpha\rho}{\sqrt{1-\alpha^2 p^2}}\frac{(1-\beta^2 p^2)^2}{(1+\beta^2 p^2)^2}\left(\frac{\rho}{\rho_0}\right)^{-4\beta^2 p^2}$$

This new expression for elastic impedance, in terms of the compressional and shear velocities, and the reference density value, provides a reflectivity coefficient error of:

$$\Delta = p^2\left(4\overline{\beta}\Delta\beta\ln\left[\frac{\overline{\rho}}{\rho_0}\right]\right) + p^6\left(4\overline{\beta}^5\Delta\beta\right) + \ldots$$

In this error expression, the fourth order p term is eliminated entirely, and the magnitude of the error in the sixth order p term is significantly reduced. While additional rational approximations may be utilized, in similar manner as that resulting in the above reduced error term, it is believed, according to the present invention, that this expression for elastic impedance provides excellent results while maintaining a simple form. Specifically, in a two layer system, the second order p term exactly vanishes if the shear velocity in the exponent of the density factor is replaced by the average shear velocity across the boundary (i.e., $\Delta\beta=0$). However, any error that is introduced by use of the layer shear velocity relative to the average across the boundary is believed to be quite small, and it has been found that it is preferred to not have the elastic impedance model depend upon average quantities across the interface.

Figure 8:
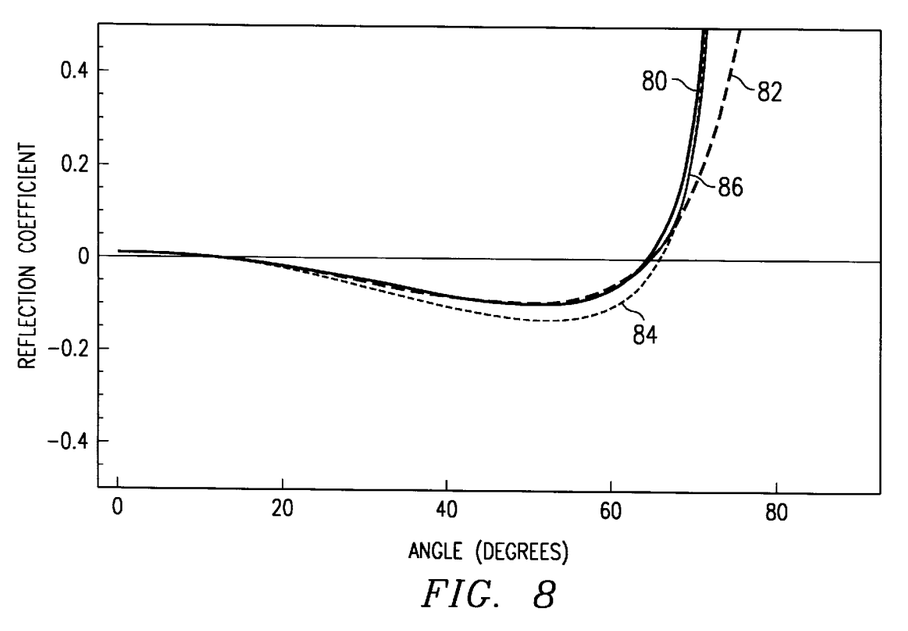
FIG. 8 is a plot of reflection coefficient over angle of incidence, comparing the performance of the elastic impedance model of the present invention to the exact reflection coefficient and to a conventional approximation.

FIG. 8 illustrates a comparison, over varying angle of incidence, of the exact reflection coefficient between two theoretical strata, to the reflection coefficient for these strata derived according to the above-described model. In this example, the upper layer (k=1) has a compressional velocity $\alpha_1=2.77$ km/s, shear velocity $\beta_1=1.52$ km/s, and density $\rho_1=2.35$ g/cc, while the immediately adjacent lower layer (k=2) has a compressional velocity $\alpha_2=3.08$ km/s, shear velocity $\beta_2=1.98$ km/s, and density $\rho_2=2.14$ g/cc. These velocities and densities correspond to a shale over a Class II gas sand, and thus relate to a petrophysically important structure. In FIG. 8, curve 80 corresponds to the exact reflection coefficient variation over angles of incidence, given the above parameters. Curve 82 illustrates the angle-dependent reflection coefficient derived according to the Aki and Richards approximation; as evident in FIG. 8, this approximation deviates from the exact coefficient at higher angles of incidence.

Curve 84 illustrates the reflection coefficient over angle of incidence as derived according to the model:

$$r_{EI}(p) = \frac{EI_k - EI_{k-1}}{EI_k + EI_{k-1}}$$

of the present invention, where the elastic impedances EI are derived from $$EI_{new} = \frac{\alpha\rho}{\sqrt{1-\alpha^2 p^2}}\frac{(1-\beta^2 p^2)^2}{(1+\beta^2 p^2)^2}\left(\frac{\rho}{\rho_0}\right)^{-4\beta^2 p^2}$$

using a reference density $\rho_0$ of 2.0 g/cc. As evident from FIG. 8, this reflection coefficient curve relatively closely approximates the angle-dependent behavior of the exact curve 80. Curve 86 illustrates the reflection coefficient behavior over angle of incidence, using the model of the present invention described hereinabove, but where the reference density $\rho_0$ is 2.3 g/cc. This curve 86 virtually overlies the exact reflection coefficient curve 80, over the entire plotted range of angle of incidence.

As such, the present invention provides an accurate reflectivity model over varying angles of incidence, such that inversion using this model, as will be described hereinbelow, will provide accurate indications of rock properties. Further, the this model is relatively insensitive to the particular value of reference density $\rho_0$, as evident by comparing curves 84, 86 in FIG. 8. This insensitivity is believed to be due to the relatively narrow range of density values in typical subsurface regions, as compared to the corresponding range over which velocities vary. As a result, actual density values do not deviate significantly from the reference density, so that the resulting behavior will not vary significantly over reasonable values of the reference density.

Referring now to FIG. 5, a generalized method of impedance inversion and automated survey interpretation according to the preferred embodiment of the present invention will now be described. As will be apparent from the following description, he generalized model illustrated in FIG. 5 is an overall inversion analysis process, such as that described above relative to FIG. 1. According to the preferred embodiment of the present invention, certain operations that can be carried out using an impedance model, such operations including the tying of well logs to seismic sections, wavelet extraction, construction of a physical earth model, and analysis of the model, are performed using the above-described new impedance model. It will be understood by those in the art, having reference to this specification, that while multiple such operations in the overall method of FIG. 5 utilize this new impedance model, it is not essential that the new model be used in each such instance. Indeed, use of the above-described impedance model in at least one or more of these operations is contemplated to provide significant benefit in the automated interpretation of the survey. Of course, full use of the model, for example as in the manner described hereinbelow, is believed to provide maximum benefit in the interpretation.

In the generalized method according to the preferred embodiment of the invention as shown in FIG. 5, several types of data are used as inputs. One type of data corresponds to well logs, obtained in the conventional manner at well locations in the survey region. This well log data preferably includes information corresponding to deviations, check shots, and tops, as known in the art; according to this embodiment of the invention, these well log data include both density and velocity logs of the strata in the vicinity of the logged well locations. Another data type corresponds to the time-domain seismic sections obtained over the survey region; these seismic sections are preferably initially processed, by way of conventional filtering, normal move-out correction, and the like, prior to use in the inversion process according to the preferred embodiment of the invention; as the preferred embodiment of the invention utilizes offset-dependent data to analyze the composition of the subsurface strata, however, the seismic section data are not stacked at this point in the process. Another data type used in this embodiment of the invention is referred to as "horizon" data. As is known in the art, horizons refer to interpreted and interpolated surfaces within a 3-D seismic volume which correspond to potential reflective interfaces between subsurface strata. The horizons may be produced from amplitude peaks of conventional seismic data, or from other data attributes. In the system of FIG. 3, these data are contemplated to be stored in disk storage, such as disk storage device 31, and retrieved therefrom by system computer 22.

According to the preferred embodiment of the invention, the well log data include both sonic logs and density logs. As well known in the art, sonic logs correspond to travel time measurements of acoustic signals along a fixed distance between a source and one or more receivers in a logging tool, as refracted through the earth surrounding the borehole; as such, conventional sonic logs measure acoustic velocity over short distances at selected locations along a borehole. Density logs measure the density of the surrounding rock at selected locations along the depth of a borehole, for example by measuring the rock response to gamma radiation or by precise gravity measurements. In any case, system computer 22 retrieves well log data from disk storage device 31 corresponding to well logs taken at one or more well location W, each log preferably including the values (or estimates, as the case may be) of compressional velocity $\alpha_k$, shear velocity $\beta_k$, and density $\rho_k$ for each layer k that is at or above the deepest layer of interest in the survey region. Alternatively, estimates of density and shear velocity may be used rather than actual well logs, but of course such estimates may introduce error into the results.

According to the preferred embodiment of the invention, system computer 22 performs process 35 to derive or estimate reference density $\rho_0$. Reference density $\rho_0$ is a constant reference density, preferably selected to correspond to the average of the densities $\rho_k$ for layers k in the survey region of interest This average may be a simple arithmetic mean, or alternatively may be derived as a weighted average of the densities $\rho_k$, weighted by layer thickness. As noted above, the elastic impedance model according to the preferred embodiment of the invention is not particularly sensitive to this reference density $\rho_0$, and as such the particular method by way of which reference density $\rho_0$ is derived is not believed to be critical to the accuracy of the overall inversion process. Indeed, it has been observed that reasonable accuracy may be obtained according to the present invention simply by selecting a typical average density value (e.g., 2.3 g/cc) as reference density $\rho_0$, without requiring actual measurements. If well logs from multiple well locations W are retrieved by system computer 22, it is contemplated that reference density $\rho_0$ may be produced from the overall average of the densities, assuming some degree of homogeneity of the density logs over the multiple well locations W. This reference density $\rho_0$ is contemplated to be independent of angle of incidence, and as such, according to this preferred embodiment of the invention, may be generated once and applied to inversion process for each offset range, as will become apparent from the following description.

According to the preferred embodiment of the invention, process 36 is next performed, by way of which an offset range of interest is selected; the selection may be made by a human interpreter by input via keyboard 26 or pointing device 25, or instead may be an automated selection determined by the computer program being executed by system computer 22 itself. As will become apparent from the following description, it is preferred that the inversion process of the present invention be performed for multiple offset ranges, corresponding to multiple angles of incidence. For example, the inversion may be performed upon near-offset seismic data, and also upon data from a close range of offset distances corresponding to about a 30° angle of incidence. Of course, the particular offset ranges may be selected according to the inversion analysis desired. In any event, it is preferred that the offset range selected in process 36 be relatively narrow, for example corresponding to traces having an angle of incidence at each depth point within a 10° variation.

Figure 6:
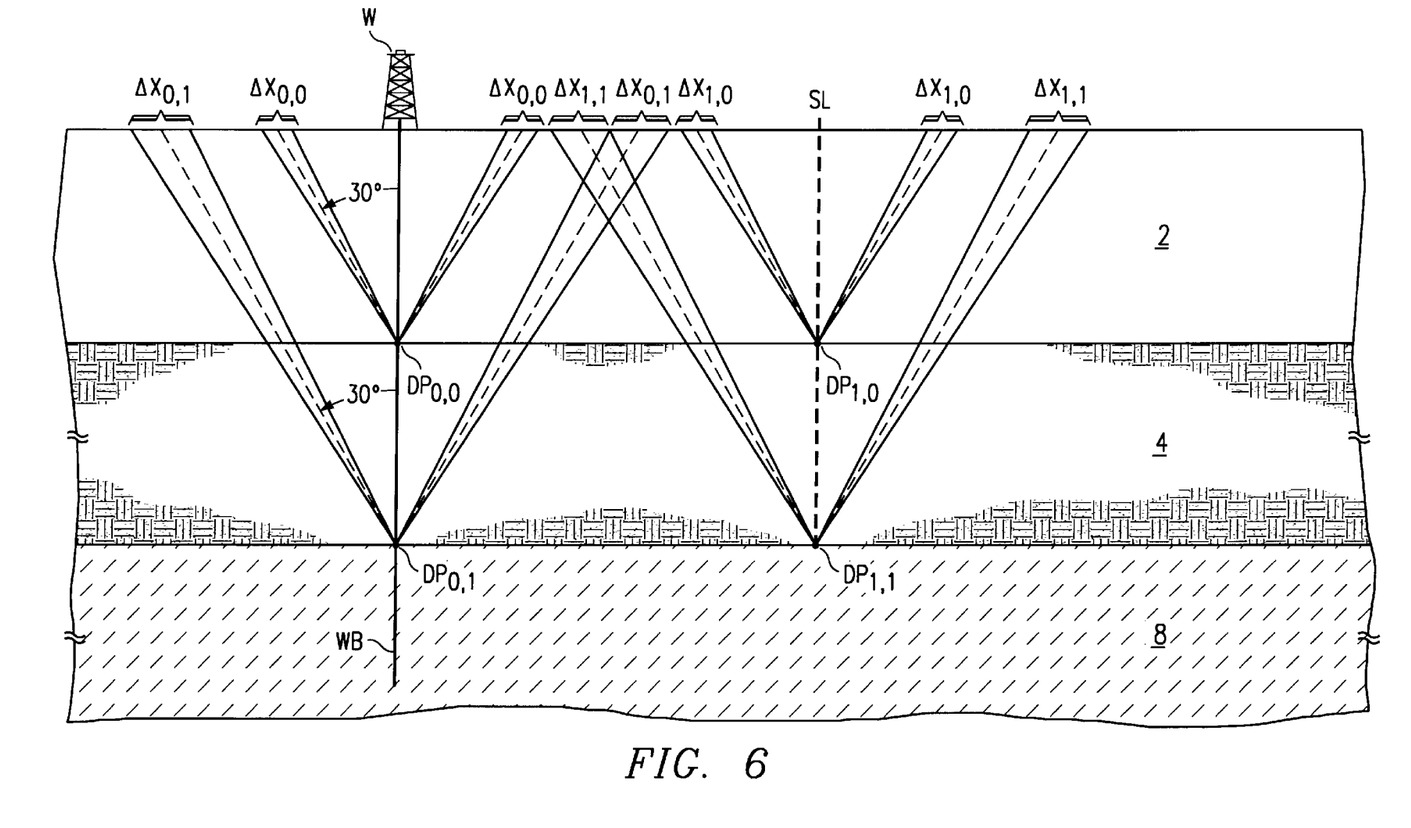
FIG. 6 is a schematic diagram of a cross-section of the earth, illustrating a particular offset range selected for multiple depth points at multiple midpoints in a survey region, according to the preferred embodiment of the invention.

As is well understood in the art, inversion involves the generation of a model of the earth that is "tied" to well logs at a few discrete locations, and then the application of this model over an entire seismic survey section. Because the model is applied to many depth points in the survey region, according to the preferred embodiment of the invention, selection of traces within a particular offset range centered at an angle of incidence (or ray parameter, as described above) must be made for these many depth points within the survey region, at varying depth and also underlying many survey midpoints. FIG. 6 illustrates a pair of exemplary surface locations, or midpoints, under which corresponding depth points DP are located. In this example, well location W overlies depth point $DP_{0,0}$ at the interface between strata 2, 4, and deeper depth point $DP_{0,1}$ at the interface between strata 4,8. Similarly, surface location SL (no well being present thereat) overlies depth point $DP_{1,0}$ at the interface between strata 2, 4, and also depth point $DP_{1,1}$.

FIG. 6 illustrates the offset ranges that will be selected for each of these four depth points DP in an instance where the center angle of incidence in the offset range is approximately 30° from the normal. As shown in FIG. 6, the selected offset range $\Delta x_{0,0}$ is associated with depth point $DP_{0,0}$, offset range $\Delta x_{0,1}$ is associated with depth point $DP_{0,1}$, and so on. Retrieval of seismic data associated with the selection of this offset range will thus retrieve traces for each depth point DP in the survey (including both those depth points associated with well locations W, and also those associated with non-well surface locations SL) for which the offset distance lies within the selected range. For the example of FIG. 6, this retrieval will retrieve, for depth point $DP_{0,0}$, only those traces having an offset within selected offset range $\Delta x_{0,0}$; similarly, such retrieval, for depth point $DP_{0,1}$, will retrieve only those traces having an offset within selected offset range $\Delta x_{0,1}$, and so on.

Following selection of the offset range in process 36, system computer 22 performs process 38 to derive an impedance model for the angle of incidence, or ray parameter, corresponding to the selected offset range. According to the present invention, the particular expression for elastic impedance used in process 38 corresponds to that described hereinabove. To reiterate, according to the preferred embodiment of the present invention, the elastic impedance for a given layer in the earth may be modeled as:

$$EI_{new} = \frac{\alpha \rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

where $\alpha$ is the compressional velocity for the layer, $\beta$ is the shear velocity for the layer, and $\rho$ is the density of the layer; as noted above, $\rho_0$ is the reference density derived in process 35. This expression of the elastic impedance EI for the various layers provides the significant advantages of being valid over a wide range of offsets, and being based upon physically measurable quantities. Inclusion of the reference density $\rho_0$ greatly reduces the error sensitivity of this expression. The elastic impedance model produced in process 38 thus provides a series of elastic impedance values for each layer of the earth at each of the well locations W for which well log data was retrieved.

In process 40, system computer 22 generates a pseudo-density log for each well location W by dividing the elastic impedance values of the model, over depth, by the logged velocity at the corresponding depth for that well location. In effect, the pseudo-density log generated in process 40 is simply a scaled version of the elastic impedance model at the well location W, where the scaling factor is the velocity measured by layer thereat. The generation of the pseudo-density log in process 40 is preferred, as most well log editing and tying processes, as well as wavelet estimation and inversion programs, operate upon velocity and density log data, rather than upon impedance values, and as such process 40 places the impedance model generated in process 38 into a form that can be directly handled by conventional inversion software packages.

The pseudo-density log or logs, and the corresponding sonic logs, are then applied by system computer 22 to well log edit and tie process 44. In addition, system computer 22 at this time (or by this time) performs process 50 to retrieve the seismic data for each depth point in the survey within the offset range selected in process 36, as shown by way of example in FIG. 6. In addition, process 50 also includes the performing of a stack of these limited offset-range traces (along with performing the appropriate normal moveout correction and other filtering), to derive a stacked trace for each midpoint having survey depth points thereunder. Those stacks corresponding to midpoints that are at or near well locations W are also applied to process 44, for use in the well log edit and tying; additionally, if desired, corresponding horizon data may also be retrieved and used in process 44. Well log edit and tie process 44 is intended to calibrate the seismic sections (and, if retrieved, horizon information) to correspond to the measured well log data at the well locations, rendering the two sets of data consistent with one another as will be necessary in the subsequent inversion processes.

Well log edit and tie process 44 may be performed according to conventional techniques, addressing such inaccuracies as cycle skipping in sonic log transit times and inaccuracies in density logs, due to washout or drilling fluid invasion, for example. These corrections may be made relative to core samples taken at the well location, or relative to horizon data. Following such corrections, tying of the logs to the seismic data may include other operations such as the generation of an elastic impedance model for the layers at each well location from the well log (and pseudo-density log) data, and then generating synthetic seismographs corresponding to the elastic impedance model. In this case, the well log tying of process 44 may be performed by system computer 22 through generation of synthetic seismographs for each logged well location W using the reflectivity response of the subsurface layers based upon the elastic impedance model generated in process 38. As noted above, the reflectivity at an interface can be related to the elastic impedance of the interfacing layers as follows:

$$r_{EI}(p) = \frac{EI_k - EI_{k-1}}{EI_k + EI_{k-1}}$$

The synthetic seismographs may be based upon an assumed input wavelet, since the true wavelet has not yet been extracted. Iterative comparison and adjustment of either or both of the well logs and the seismic data to correlate the reflection times or depth with one another at the well locations W is then carried out, thus "tying" the well logs to the seismic data (and vice versa) at those locations.

Of course, alternative approaches to performing well log and tie process 44 may also be used. In any event, it is contemplated that those of ordinary skill in the art having reference to this specification will readily comprehend the nature, extent, and procedure for carrying out such well log editing and correction relative to process 34 of this embodiment of the invention.

Once the well logs are tied to the limited-offset seismic stacks at the well locations W by process 44, system computer 22 next carries out wavelet estimation process 46, using the impedance model at well locations W, as tied to the seismic data. Several techniques for wavelet estimation process 46 are known in the art and may be used according to this preferred embodiment of the invention, such approaches including iterative deconvolution techniques, Weiner filter generation, and the like. According to the preferred embodiment of the invention, wavelet estimation process 46 uses the elastic impedance model, generated in process 38 and tied to the seismic data in process 44, to produce a series of reflectivity coefficients which provide a model of the earth response. These coefficients, as a response function, are then applied to the limited-offset seismic stack at one or more well locations W, for example by division in the frequency domain or deconvolution in the time domain, to return a source signature corresponding to the input wavelet. This input wavelet, as is known in the art, corresponds to the input energy that is received by each of the layers of the earth at the location of interest, including any distortion and attenuation that may occur along the acoustic path.

Following the estimation of the input wavelet in process 48, system computer 22 next performs the inversion of the seismic data retrieved and stacked in process 50, at the limited offset range selected in process 36, for all depth points, including those away from the tied well locations W. While the inversion of process 50 may be accomplished according to any conventional technique, constrained sparse spike inversion has been utilized in connection with the preferred embodiment of the invention with good success.

For example, inversion process 50 may be executed by system computer 22 first convolving (in the time domain) or multiplying (in the frequency domain) each of the retrieved limited-offset stacks with the filter derived from wavelet estimation process 48 corresponding to the input wavelet. The result of this filter operation will produce, for each midpoint, a trace corresponding to the reflectivity response over depth, for the associated depth points thereunder. This reflectivity series can then be transformed into an elastic impedance trace, for each midpoint, by applying the following relationship to the reflectivity series:

$$r_{EI}(p) = \frac{EI_k - EI_{k-1}}{EI_k + EI_{k-1}}$$

This transformation will begin with a measured elastic impedance $EI_0$ for the uppermost layer, and will then proceed downward in depth until all layers of interest at the midpoint have an elastic impedance value associated therewith. The elastic impedance values $EI(p)$ are generated and retained in memory in association with the value of ray parameter p corresponding to the selected offset range of the seismic data. Upon completion of the inversion process for all of the midpoints of the survey section retrieved in process 50, an elastic impedance section of this survey region, at the selected angle of incidence, is thus generated.

As noted above, however, seismic reflection data are inherently band-limited, lacking low-frequency information. Accordingly, the elastic impedance section generated in process 50 by the inversion of band-limited seismic reflection data is itself necessarily band-limited, lacking low-frequency information. However, low frequency information regarding the offset-dependence of elastic impedance is important in order to retrieve important rock property information. The preferred embodiment of the present invention utilizes such low frequency information, at multiple angles of incidence, in rendering an interpretation of the survey results.

Referring back to FIG. 5, the inclusion of this low frequency information will now be described. Following the generation of the pseudo-density log in process 40, using the elastic impedance model described above, the sonic (velocity) and pseudo-density logs are filtered by system computer 22, by way of a digital filter operation, in process 42. The cutoff frequency of the low pass filter process 42 corresponds approximately to the lower frequency at which seismic data is responsive, for example at about 5 Hz. These logs are used by system computer 22, in combination with retrieved horizon data, in process 52 to generate a low frequency earth model of elastic impedance over the survey region. Process 52 may be carried out by way of conventional earth model generation systems, such as implemented within inversion software systems from Jason Geoscience. In general, process 52 associates the filtered velocity and pseudo-density log values with the formations bounded by the horizons indicated in the retrieved data. Following this assignment, an elastic impedance earth model, at low frequency, is derived in process 52 by the application of the above-described angle-dependent relationship:

$$EI_{new} = \frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

Accordingly, a low-frequency elastic impedance model for the earth results from system computer 22 executing process 52; this model is based upon the ray parameter p associated with the offset range selected in process 36.

Upon generation of the band-limited elastic impedance section from process 48 and the low frequency earth model from process 52, system computer 22 then merges the section and model into a single broadband merged model, in process 54. The merger of process 54 may be a simple summation in the time domain, if the frequencies of the section and model do not significantly overlap; alternatively, some filtering or weighted summation may be used to normalize the amplitudes over the resulting frequency band. In process 56, the merged broadband model is then stored by system computer 22 in association with the selected offset range (i.e., angle of incidence, ray parameter); for example, system computer 22 may store these results in disk storage device 29 in the system of FIG. 3.

Decision 57 is then executed, to determine if another offset range (angle of incidence) is to be analyzed. As will be apparent from the following description, the preferred embodiment of the invention utilizes at least two different offset ranges, for example one centered at approximately 30° and another centered at zero-offset, in order to provide interpretive results regarding rock properties. Accordingly, if another offset range remains to be used in generating a broadband elastic impedance model (decision 57 is YES), control passes back to process 36, and the inversion process is then repeated for the newly selected offset range. Upon completion of the broadband elastic impedance models for all desired offset ranges (decision 57 is NO), system computer 22 then passes control to process 60, in which the models are used to interpret rock properties of the underlying geology, as will now be described.

According to the present invention, the elastic impedance expression used in the inversion process described above depends only upon the medium parameters of each layer, and the selected or derived reference density value. This elastic impedance thus scales with density and compressional velocity in the same way as does acoustic impedance, and varies with angle of incidence in a simple way with the Poisson's ratio of the medium. This angular relationship is used to advantage in interpretation of the subsurface layers, according to the preferred embodiment of the invention, as will now be described.

As described above, the expression for elastic impedance used in the generation of the pseudo-density log, wavelet extraction, inversion processing, and earth model generation according to the preferred embodiment of the invention is as follows:

$$EI_{new} = \frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

According to the preferred embodiment of the invention, a further approximation of this elastic impedance expression, in terms of ray parameter p, provides elastic impedance $EI_{app}$ as follows:

$$EI_{app} \approx \frac{\alpha\rho}{\sqrt{1-\alpha^2 p^2}} \left[1 - 4\left\{1 + \ln\left(\frac{\rho}{\rho_0}\right)\right\}\beta^2 p^2\right]$$

This expression may be expressed as a function of angle of incidence i as follows:

$$EI_{app} \approx \frac{\alpha\rho}{\cos(i)} \left[1 - 4\left\{1 + \ln\left(\frac{\rho}{\rho_0}\right)\right\}\left(\frac{\beta}{\alpha}\right)^2 \sin^2(i)\right]$$

For the zero offset case (i=0), the approximated elastic impedance $EI_{app}$ reduces to the simple product of compressional velocity a and density p, which is the acoustic impedance. Expansion of the cosine term provides a ratio of elastic impedance values, namely a ratio of elastic impedance $EI_{app}(i)$ for a non-zero angle of incidence i, to the acoustic impedance $\alpha\rho$, as follows:

$$\frac{EI_{app}(i)}{\alpha\rho} \approx 1 + \left[\frac{1}{2} - 4\left\{1 + \ln\left(\frac{\rho}{\rho_0}\right)\right\}\left(\frac{\beta}{\alpha}\right)^2\right]\sin^2(i)$$

This ratio indicates that, for a Poisson's ratio of about 0.43 (approximated by $1/\sqrt{8}$), the $\sin^2$ term vanishes, and the elastic to acoustic impedance ratio is unity. As the Poisson's ratio falls below this value, the elastic impedance falls below the acoustic impedance for non-zero offset angles. This direct relationship between the angle-dependent elastic-to-acoustic impedance ratio and Poisson's ratio provides the ability to extract rock properties from the impedance inversion of seismic data at multiple angles, according to the preferred embodiment of the invention.

Figure 7:
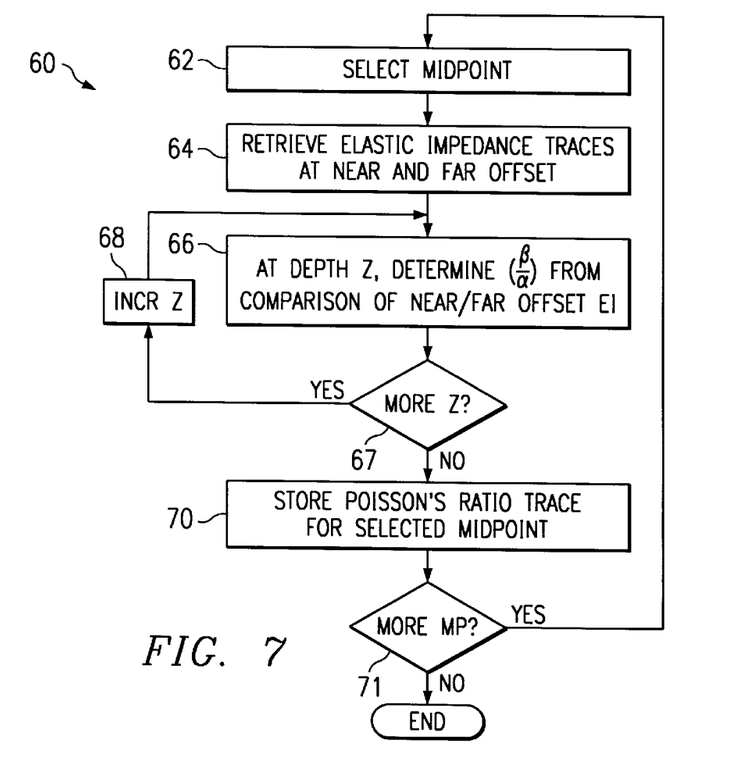
FIG. 7 is a flow diagram illustrating the operation of a rock analysis process in the method of FIG. 5 according to the preferred embodiment of the invention.

After obtaining the impedance inversion models at various angles (decision 57 is NO) in the process of FIG. 5, rock analysis process 60 is then performed by system computer 22 to derive rock properties such as Poisson's ratio for each layer, preferably using the elastic impedance to acoustic impedance ratio described immediately above. This analysis process may be accomplished by various techniques, including linear or non-linear regression of angular variations to empirically solve for Poisson's ratio, and the like. It is further contemplated, according to the present invention, that other parameters, such as porosity, can also be determined from linear or non-linear combinations of elastic impedance and acoustic impedance. Referring now to FIG. 7, a preferred method of analysis of the rock properties of a survey region according to the preferred embodiment of the present invention will now be described.

The method of FIG. 7 begins with selection of a midpoint, or surface location, in the survey region, shown as process 62. For the selected midpoint, system computer 22 then performs process 64 to retrieve, from disk storage device 29 in the system of FIG. 3, the elastic impedance traces generated for at least two offset ranges in instances of processes 54, 56 described above. These traces will conventionally be data points of elastic impedance over depth; alternatively, the impedance traces may be arranged over reflection time, as known in the art. As noted above, it is preferred that at least one of the offset ranges retrieved in process 64 include the zero-offset elastic impedance trace which, as noted above, substantially corresponds to the acoustic impedance of the material. It is also preferred that the non-zero elastic impedance trace or traces retrieved in process 64 include a convenient angle for calculation purposes.

Selection of the difference in angles of incidence used in the inversion process, and retrieved in process 64, may be made so as to facilitate analysis process 60. For example, it has been found that 30° is a convenient angle of incidence, as will now be described for a specific example. Using the above-described ratio of elastic to acoustic impedance:

$$\frac{EI_{app}(i)}{\alpha\rho} \approx 1 + \left[\frac{1}{2} - 4\left\{1 + \ln\left(\frac{\rho}{\rho_0}\right)\right\}\left(\frac{\beta}{\alpha}\right)^2\right]\sin^2(i)$$

a relationship of the ratio $\beta/\alpha$ to the elastic impedance $E_{app}(30°)$ may be readily derived as:

$$\left(\frac{\beta}{\alpha}\right)^2 \approx \frac{1}{\left\{1 + \ln\left(\frac{\rho}{\rho_0}\right)\right\}} \left[\frac{9}{8} - \frac{EI_{app}(30°)}{\alpha\rho}\right]$$

As is well known in the art, the ratio $\beta/\alpha$ determines Poisson's ratio $\sigma$ as follows:

$$\sigma = \frac{\frac{1}{2} - \frac{\beta^2}{\alpha^2}}{1 - \frac{\beta^2}{\alpha^2}}$$

Accordingly, the relationship of ratio $\beta/\alpha$ to the elastic impedance $EI_{app}(30°)$, according to this preferred embodiment of the invention, provides a direct way of deriving Poisson's ratio from the retrieved elastic impedance traces.

Referring back to FIG. 7, process 66 is next performed at a first depth z, by system computer 22. In process 66, system computer 22 derives a value of Poisson's ratio at this depth z from the above relationship, or from a similar relationship derived for the particular angle of incidence that was previously selected. In decision 67, system computer 22 determines if additional depth points remain to be analyzed for the current midpoint; if so (decision 67 is YES), the depth z is incremented in process 68 and analysis process 66 is repeated. Typically, it is contemplated that the repeated instances of process 66 will be carried out from near the surface toward deeper depths (i.e., for increasing z).

Upon completion of Poisson's ratio analysis process 66 for each of the desired depths for the selected midpoint, system computer 22 stores a Poisson's ratio trace for the selected midpoint, in process 70. Decision 71 is then executed to determine if additional midpoints remain to be processed; if so (decision 71 is YES), control passes back to process 62 for selection of the next midpoint, and the generation of a Poisson's ratio trace for this next midpoint is then performed in the manner described above. Upon completion of all midpoints (decision 71 is NO), the generation of a Poisson's ratio section for the survey region is complete.

Various conventional display techniques may be used for the presentation of the results of the preferred embodiment of the invention. For example, a color display may be used to indicate, with varying color, the Poisson's ratio of a 2-D slice into the earth, with the color varying as a function of depth and x-position in the survey region. This may, of course, be expanded into a 3-D representation of the survey region if sufficient data is analyzed and interpreted.

Other uses of the present invention are also contemplated. For example, other rock properties may be inferred from the angle-dependent relationship of elastic impedance, or from the Poisson's ratio sections determined therefrom as described above, such properties including porosity, pore fill, and the like. In addition, other techniques for analysis of the Poisson's ratio are also contemplated, such techniques including regression analysis to derive a best-fit expression of Poisson's ratio to the angle-dependent impedance relationships. Because the elastic impedance model described herein provides the advantages that the impedance expression are dependent only upon layer properties, and that the resulting impedance may be used for large offset, it is further contemplated that the present invention may be used to advantage in other types of inversion and in other processing of survey data.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

I claim:

1. A method of operating a computer to perform an inversion of seismic survey traces associated with a plurality of midpoints in a survey region, and obtained over a plurality of offset distances, comprising the steps of:

retrieving well log data including compressional velocity, shear velocity, and density data, over depth for at least one well location in the survey region;

selecting a first angle of incidence;

generating an elastic impedance model using the compressional velocity, shear velocity, and density log data and dependent upon the first angle of incidence;

retrieving, from memory, seismic survey data for a plurality of midpoints in the survey region having offset distances at or near the first angle of incidence;

stacking the retrieved seismic survey data by midpoint;

performing an inversion of the stacked retrieved seismic survey data according to the generated elastic impedance model, to generate a first impedance section for the survey region associated with the first angle of incidence;

combining the first impedance section with a low-frequency impedance model associated with the first angle of incidence, to generate a first merged impedance model for the survey region associated with the first angle of incidence;

selecting a second angle of incidence;

repeating the generating, retrieving, stacking, performing, and combining steps to generate a second merged impedance model for the survey region associated with the second angle of incidence; and producing a survey of rock properties in the survey region using a comparison of the first and second merged impedance models at corresponding depth points.

2. The method of claim 1, further comprising:

deriving a reference density for the survey region from the retrieved density data;

wherein the steps of generating an elastic impedance model also uses the reference density.

3. The method of claim 2, wherein the steps of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence.

4. The method of claim 1, further comprising:

before the step of performing an inversion, retrieving seismic survey data for at least one midpoint respectively corresponding to the at least one well location in the survey region; and tying the well log data to the retrieved seismic survey data at the corresponding at least one midpoint and at least one well location.

5. The method of claim 1, further comprising:

before the step of performing an inversion, retrieving seismic survey data for at least one midpoint respectively corresponding to the at least one well location in the survey region; and estimating an input wavelet by applying the elastic impedance model to the retrieved seismic survey data for the at least one midpoint.

6. The method of claim 5, wherein the step of performing an inversion comprises:

applying the estimated input wavelet to the stacked retrieved seismic data for each of the plurality of midpoints, to recover a reflectivity series for each of the plurality of midpoints; and determining an elastic impedance value for a plurality of depths for each of the plurality of midpoints, from the reflectivity series.

7. The method of claim 1, wherein the step of producing a survey of rock properties in the survey region comprises:

retrieving the first and second merged impedance models for a first one of the plurality of midpoints; and for each of a plurality of depths associated with the first midpoint, determining the value of a selected rock property from a ratio of the impedance values of the first and second merged impedance models at the depth.

8. The method of claim 7, further comprising:

deriving a reference density for the survey region from the retrieved density data;

wherein the steps of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence;

and wherein the step of determining the value of a selected rock property comprises determining, from the ratio of the impedance values of the first and second merged impedance models, a ratio of shear velocity to compressional velocity for each of the plurality of depths.

9. The method of claim 8, wherein the step of determining the value of a selected rock property further comprises determining Poisson's ratio from the ratio of shear velocity to compressional velocity, for each of the plurality of depths.

10. A computer-readable memory having a storage medium configured so that, when read and used by a computer, the computer is directed to perform an inversion of seismic survey traces associated with a plurality of midpoints in a survey region, and obtained over a plurality of offset distances, said computer directed by a plurality of operations comprising:

retrieving, from a memory device, well log data including compressional velocity, shear velocity, and density data, over depth for at least one well location in the survey region;

selecting a first angle of incidence;

generating an elastic impedance model using the compressional velocity, shear velocity, and density log data and dependent upon the first angle of incidence;

retrieving, from a memory device, seismic survey data for a plurality of midpoints in the survey region having offset distances at or near the first angle of incidence;

stacking the retrieved seismic survey data by midpoint;

performing an inversion of the stacked retrieved seismic survey data according to the generated elastic impedance model, to generate a first impedance section for the survey region associated with the first angle of incidence;

combining the first impedance section with a low-frequency impedance model associated with the first angle of incidence, to generate a first merged impedance model for the survey region associated with the first angle of incidence;

selecting a second angle of incidence;

repeating the generating, retrieving, stacking, performing, and combining steps to generate a second merged impedance model for the survey region associated with the second angle of incidence; and producing and storing, in a memory device, a survey of rock properties in the survey region using a comparison of the first and second merged impedance models at corresponding depth points.

11. The computer-readable memory of claim 10, wherein the plurality of operations further comprises:

deriving a reference density for the survey region from the retrieved density data;

and wherein the operations of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence.

12. The computer-readable memory of claim 10, wherein the plurality of operations further comprises:

before the step of performing an inversion, retrieving seismic survey data for at least one midpoint respectively corresponding to the at least one well location in the survey region; and estimating an input wavelet by applying the elastic impedance model to the retrieved seismic survey data for the at least one midpoint;

and wherein the operation of performing an inversion comprises:

applying the estimated input wavelet to the stacked retrieved seismic data for each of the plurality of midpoints, to recover a reflectivity series for each of the plurality of midpoints; and determining an elastic impedance value for a plurality of depths for each of the plurality of midpoints, from the reflectivity series.

13. The computer-readable memory of claim 10, wherein the plurality of operations further comprises:

deriving a reference density for the survey region from the retrieved density data;

wherein the operations of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence;

and wherein the operation of producing a survey of rock properties in the survey region comprises:

retrieving the first and second merged impedance models for a first one of the plurality of midpoints; and determining, from a ratio of the impedance values of the first and second merged impedance models at each of a plurality of depths associated with the first midpoint, a ratio of shear velocity to compressional velocity.

14. The computer-readable memory of claim 13, wherein the operation of producing a survey of rock properties in the survey region further comprises determining Poisson's ratio from the ratio of shear velocity to compressional velocity, for each of the plurality of depths.

15. A digital computing system for performing an inversion of seismic survey traces associated with a plurality of midpoints in a survey region, and obtained over a plurality of offset distances, comprising:

a memory resource, for storing data corresponding to well log data including compressional velocity, shear velocity, and density data, over depth for at least one well location in the survey region, data corresponding to seismic survey data for a plurality of midpoints in the survey region, the seismic survey data corresponding to varying offset distances, and horizon data corresponding to the location of boundaries between adjacent formations in the survey region;

a computer system output device; and a system computer, coupled to the memory resource and to the output device, for performing the operations of:
retrieving well log data from the memory resource for at least one well location in the survey region;
selecting a first angle of incidence;
generating an elastic impedance model using the compressional velocity, shear velocity, and density log data and dependent upon the first angle of incidence;
retrieving, from the memory resource, seismic survey data for a plurality of midpoints in the survey region having offset distances at or near the first angle of incidence;
stacking the retrieved seismic survey data by midpoint;
performing an inversion of the stacked retrieved seismic survey data according to the generated elastic impedance model, to generate a first impedance section for the survey region associated with the first angle of incidence;
combining the first impedance section with a low-frequency impedance model associated with the first angle of incidence, to generate a first merged impedance model for the survey region associated with the first angle of incidence;
selecting a second angle of incidence;
repeating the generating, retrieving, stacking, performing, and combining steps to generate a second merged impedance model for the survey region associated with the second angle of incidence; and
producing and forwarding, to the output device, a survey of rock properties in the survey region using a comparison of the first and second merged impedance models at corresponding depth points.

16. The digital computing system of claim 15, wherein the system computer is further programmed to perform the operations of:
deriving a reference density for the survey region from the retrieved density data;
and wherein the operations of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence.

17. The digital computing system of claim 15, wherein the system computer is further programmed to perform the operations of:
before the step of performing an inversion, retrieving seismic survey data for at least one midpoint respectively corresponding to the at least one well location in the survey region; and
estimating an input wavelet by applying the elastic impedance model to the retrieved seismic survey data for the at least one midpoint;
and wherein the operation of performing an inversion comprises:
applying the estimated input wavelet to the stacked retrieved seismic data for each of the plurality of midpoints, to recover a reflectivity series for each of the plurality of midpoints; and
determining an elastic impedance value for a plurality of depths for each of the plurality of midpoints, from the reflectivity series.

18. The digital computing system of claim 15, wherein the system computer is further programmed to perform the operations of:
deriving a reference density for the survey region from the retrieved density data;
and wherein the operations of generating an elastic impedance model comprise evaluating the expression:

$$\frac{\alpha\rho}{\sqrt{1-\alpha^2 p^2}} \frac{(1-\beta^2 p^2)^2}{(1+\beta^2 p^2)^2} \left(\frac{\rho}{\rho_0}\right)^{-4\beta^2 p^2}$$

for each of a plurality of layers in the survey region, where $\alpha$ is the compressional velocity for the layer, where $\beta$ is the shear velocity for the layer, where $\rho$ is the density for the layer, where $\rho_0$ is the reference density, and where p is the ray parameter corresponding to the selected angle of incidence;
and wherein the operation of producing a survey of rock properties in the survey region comprises:
retrieving the first and second merged impedance models for a first one of the plurality of midpoints; and
determining, from a ratio of the impedance values of the first and second merged impedance models at each of a plurality of depths associated with the first midpoint, a ratio of shear velocity to compressional velocity.

19. The digital computing system of claim 18, wherein the operation of producing a survey of rock properties in the survey region further comprises determining Poisson's ratio from the ratio of shear velocity to compressional velocity, for each of the plurality of depths.

* * * * *

UNITED STATES PATENT AND TRADEMARK OFFICE
CERTIFICATE OF CORRECTION

PATENT NO. : 6,058,073
DATED : May 2, 2000
INVENTOR(S) : Bruce J. Verwest

It is certified that error appears in the above-identified patent and that said Letters Patent is hereby corrected as shown below:

Column 1,
Line 10, "SPONSORED DEVELOPMENT" should read -- SPONSORED RESEARCH OR DEVELOPMENT --
Line 50, "modem seismic prospecting." should read -- modern seismic prospecting. --

Column 10,
Line 60, "derived from" should read -- derived from: --

Column 11,
Line 12, "the this model is relatively" should read -- this model is relatively --
Line 25, "he generalized model" should read -- the generalized model --

Column 12,
Lines 7 and 8 "As well known in the art," should read -- As is well known in the art, --
Line 32, "of interest This average" should read -- of interest. This average --

Column 17,
Line 40, "velocity a and density p" should read -- velocity $\propto$ and p --

Column 18,
Line 36, "Eapp (30°)" should read -- EIapp (30°) --

Signed and Sealed this

Fourth Day of February, 2003

JAMES E. ROGAN
*Director of the United States Patent and Trademark Office*